Patented July 27, 1926.

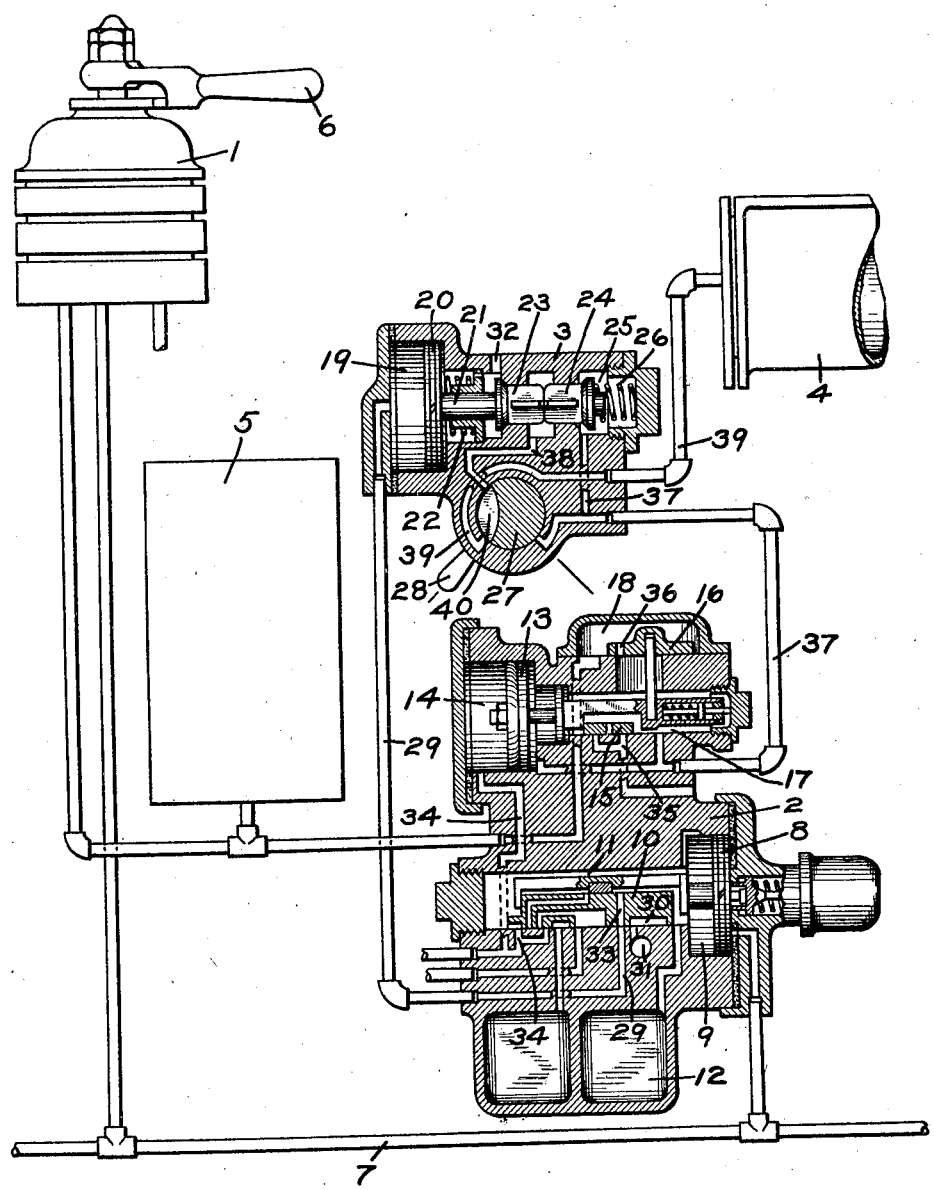

1,593,714

UNITED STATES PATENT OFFICE.

FRED B. FARMER, OF ST. PAUL, MINNESOTA, ASSIGNOR TO THE WESTINGHOUSE AIR BRAKE COMPANY, OF WILMERDING, PENNSYLVANIA, A CORPORATION OF PENNSYLVANIA.

CUT-OUT-COCK DEVICE.

Application filed August 30, 1925. Serial No. 51,322.

This invention relates to fluid pressure brakes and more particularly to a locomotive brake equipment.

When trains are operated down long, steep grades, requiring the more or less continuous use of the brakes, if the brakes on the engine are allowed to operate with the train brakes, such use is liable to result in the overheating of the driver wheel tires and the consequent loosening of same, a dangerous condition.

In order to avoid this, it is customary to install a manually operated cut-out cock, by the manipulation of which the engineer may cut out the driver brake when desired. When an emergency application of the brakes is effected, however, it is desirable that the maximum braking power be obtained and including that of the driver brakes, and consequently the engineer should move the cut-out cock to its open position before making an emergency application of the brakes. It is possible that the engineer may fail to do this, with the result that the driver brakes will not be applied. It is also possible that an emergency application of the brakes may be effected from the train by operation of the usual conductor's valve, in which case, if the cut-out cock be in closed position, the same condition will result.

The principal object of my invention is to provide means automatically operable to cut in the locomotive driver brakes, when an emergency application of the brakes is effected, in case the cut-out cock is in closed position.

In the accompanying drawing, the single figure is a diagrammatic view, partly in section, of a locomotive brake equipment embodying my invention.

As shown in the drawing, the equipment may comprise a brake valve device 1, a distributing valve device 2, a valve device 3, a brake cylinder 4, and a main reservoir 5.

The brake valve device 1 may be of the usual construction having an operating handle 6 and being connected to the usual main reservoir 5 and brake pipe 7.

The distributing valve device 2 is of the type used in connection with the well known E T locomotive brake equipment and may comprise the usual equalizing and application portions. The equalizing portion may comprise a piston 8 contained in a piston chamber 9 which is connected to the brake pipe 7, said piston being adapted to operate a slide valve 10 contained in valve chamber 11, the volume of which is augmented by a pressure chamber 12 connected thereto. The application portion may comprise a piston 13 contained in piston chamber 14 and adapted to operate slide valves 15 and 16 contained respectively in valve chambers 17 and 18.

The valve device 3 may comprise a casing having a piston chamber 19 containing a piston 20, subject on one side to the pressure of fluid supplied to piston chamber 19 and on the opposite side to the pressure of a coil spring 22. The piston 20 is provided with a piston rod 21, which is adapted to engage a valve 23. The stem of valve 23 is adapted to engage the stem of a second valve 24, so that when one valve is seated, the other will be unseated, said valve 24 being contained in a valve chamber 25 and subject on one side to the pressure of a coil spring 26. Also contained in the casing of valve device 3 is a two position plug valve 27 having an operating handle 28, said plug valve being adapted in one position to connect pipe 37 leading to the distributing valve device 2 with pipe 39 leading to the brake cylinder 4, and in its other position to cut off said communication and to connect the brake cylinder 4 to a chamber intermediate valves 23 and 24.

In the release and service positions of the slide valve 10 of the equalizing portion of the distributing valve device 2, piston chamber 19 of valve device 3 will be connected to atmosphere through pipe and passage 29, cavity 30 in slide valve 10, and atmospheric exhaust port 31, whereby permitting spring 22 to maintain piston 20 in its outer position, with piston rod 21 out of engagement with the valve 23. Spring 26 then acts to shift the valve 24 to its seat and to unseat the valve 23. With valve 23 unseated, the chamber intermediate the valves 23 and 24 is connected to atmosphere by way of atmospheric exhaust port 32.

When conditions are such that it is desirable to cut out the driver brakes, the engineer moves handle 28 and consequently plug valve 27 to the position as shown in the drawing, in which pipe 37 leading to the distributing valve device 2 is cut off from brake cylinder 4 and brake cylinder pipe 39 is connected to the chamber intermediate valves 23 and 24 by way of cavity 40 in the valve 27 and consequently to atmosphere through exhaust port 32.

If a service application of the brakes is effected while the handle 28 of valve 27 is in cut-out position, the slide valve 10 of the distributing valve device 2 will not move sufficiently to cause port 33 to register with passage 29, with the result that fluid under pressure will not be supplied to piston chamber 19 of valve device 3 and consequently the cut-out cock 27 being in closed position, fluid under pressure will not be supplied from the distributing valve device to the brake cylinder 4.

If, while the handle 28 is in cut-out position, an emergency application of the brakes is initiated by the operation of the brake valve device, a conductor's valve, or by the bursting of a hose, the sudden reduction in brake pipe pressure caused thereby permitting the higher pressure in valve chamber 11 acting on the opposite side of piston 8, to shift said piston and slide valve 10 to emergency position, in which port 33 in slide valve 10 registers with passage 29, so that fluid under pressure is supplied from valve chamber 11 to piston chamber 19 of valve device 3, through port 33 in slide valve 10 and passage and pipe 29. The pressure of fluid so supplied to piston chamber 19 acts to shift piston 20 to its innermost position, causing piston rod 21 to engage valve 23, so as to seat said valve, and by the movement of said valve, the valve 24 is unseated.

With slide valve 10 in this position, fluid under pressure from valve chamber 11 and pressure chamber 12 is also supplied through uncovered passage 34 to piston chamber 14 of the application portion. The pressure of fluid so supplied moves piston 13 inwardly, causing slide valve 15 to be shifted to a position in which exhaust passage 35 is cut off from valve chamber 17, and slide valve 16 to a position, in which fluid under pressure from valve chamber 18 and main reservoir 5 is supplied through port 36 in slide valve 16, valve chamber 17, passage and pipe 37 to valve chamber 25 of valve device 3 and since the valve 24 is unseated in emergency, as hereinbefore explained, fluid flows past said unseated valve to passage 38, thence through cavity 40 in plug valve 27 to passage and pipe 39 and to brake cylinder 4.

It will now be evident that whenever the equalizing valve device of the distributing valve device is shifted to emergency application position, the valve device 3 will be operated to establish communication from the distributing valve device to the driver brake cylinders, although the cut-out cock 27 may be in its closed position, and thus an application of the driver brakes will always be secured when an emergency application of the brakes is effected, not only when such application is initiated by operation of the brake valve device but also when initiated in any other way. This method of control also ensures the application of the driver brakes on the second locomotive in double heading service, since the equalizing portion of the distributing valve device on the second locomotive will be shifted to emergency position whenever an emergency application of the train brakes is effected.

Having now described my invention, what I claim as new and desire to secure by Letters Patent, is:—

1. In a fluid pressure brake, the combination with a brake cylinder and a brake application valve device having an emergency application position, of valve means automatically operable upon movement of said brake application valve device to emergency position to connect said brake application valve device to said brake cylinder.

2. In a fluid pressure brake, the combination with a brake cylinder and a valve device for supplying fluid under pressure to the brake cylinder to effect a service application of the brakes and to effect an emergency application of the brakes, of a cock for controlling communication through which said valve device supplies fluid to the brake cylinder and means operative upon effecting an emergency application of the brakes for opening a communication around said cock for permitting the supply of fluid from said valve device to the brake cylinder.

3. In a fluid pressure brake, the combination with a brake cylinder and valve means operative in an emergency application of the brakes for supplying fluid under pressure to the brake cylinder, a cock for controlling communication through which fluid is supplied to the brake cylinder in service and emergency application of the brakes, and means operative upon effecting an emergency application of the brakes for establishing communication from said valve means to the brake cylinder, regardless of the position of said cock.

4. In a fluid pressure brake, the combination with a brake cylinder and a cock for controlling a communication through which fluid under pressure is supplied to the brake cylinder, of means operative upon effecting an emergency application of the brakes for establishing a by-pass connection around said cock, through which fluid is supplied to the brake cylinder, when said cock is in its closed position.

5. In a fluid pressure brake, the combination with a brake cylinder, a brake pipe, and a valve device operated upon a gradual reduction in brake pipe pressure for supplying fluid under pressure to the brake cylinder to effect a service application of the brakes and upon a sudden reduction in brake pipe pressure to supply fluid to the brake cylinder to effect an emergency application of the brakes, of a cock movable to a position for cutting off communication through which fluid is supplied to the brake cylinder, and means operated upon movement of said valve device to emergency position for opening a by-pass through which fluid is supplied to the brake cylinder when said cock is in its closed position.

6. In a fluid pressure brake, the combination with a brake cylinder and a brake pipe, of a cock for controlling communication through which fluid under pressure is supplied to the brake cylinder and valve means operated upon a sudden reduction in brake pipe pressure for opening a by-pass around said cock, through which fluid is supplied to the brake cylinder in case said cock is in its closed position.

In testimony whereof I have hereunto set my hand.

FRED B. FARMER.